United States Patent
Kleinert et al.

(10) Patent No.: US 12,326,645 B2
(45) Date of Patent: Jun. 10, 2025

(54) PHASED-ARRAY BEAM STEERING FOR MATERIALS PROCESSING

(71) Applicant: ELECTRO SCIENTIFIC INDUSTRIES, INC., Beaverton, OR (US)

(72) Inventors: Jan Kleinert, Beaverton, OR (US); Justin Redd, Raleigh, NC (US); James Brookhyser, Beaverton, OR (US)

(73) Assignee: ELECTRO SCIENTIFIC INDUSTRIES, INC., Beaverton, OR (US)

( * ) Notice: Subject to any disclaimer, the term of this patent is extended or adjusted under 35 U.S.C. 154(b) by 773 days.

(21) Appl. No.: 17/290,198

(22) PCT Filed: Feb. 4, 2020

(86) PCT No.: PCT/US2020/016631
§ 371 (c)(1),
(2) Date: Apr. 29, 2021

(87) PCT Pub. No.: WO2020/171946
PCT Pub. Date: Aug. 27, 2020

(65) Prior Publication Data
US 2021/0376549 A1    Dec. 2, 2021

Related U.S. Application Data

(60) Provisional application No. 62/823,454, filed on Mar. 25, 2019, provisional application No. 62/808,742, filed on Feb. 21, 2019.

(51) Int. Cl.
*G02F 1/29* (2006.01)
*G02F 1/295* (2006.01)
*B23K 26/067* (2006.01)

(52) U.S. Cl.
CPC .......... *G02F 1/292* (2013.01); *G02F 1/2955* (2013.01); *B23K 26/0676* (2013.01)

(58) Field of Classification Search
CPC .......... G02F 1/292; G02F 1/2955; G02F 1/29; B23K 26/0676; H01S 3/1305;
(Continued)

(56) References Cited

U.S. PATENT DOCUMENTS 6,678,294 B1    1/2004    Komine et al.
6,708,003 B1    3/2004    Wickham et al.
(Continued)

FOREIGN PATENT DOCUMENTS

EP    2372420 A1    10/2011
EP    2597792 B1    4/2016
(Continued)

OTHER PUBLICATIONS

The European Search Report for European counterpart application No. 20759149.6 dated Jan. 9, 2023 (8 pages).
(Continued)

*Primary Examiner* — Balram T Parbadia
(74) *Attorney, Agent, or Firm* — Laurin T. Buettner

(57) ABSTRACT

A system includes a multi-channel beam splitter arranged and configured to split an input optical signal into a plurality of split optical signals; a plurality of phase modulators, wherein each phase modulator of the plurality of phase modulators is operative to modify a phase of a corresponding split optical signal of the plurality of split optical signals in response to a control signal; a waveguide arranged at an optical output of the plurality of phase modulators, the waveguide configured to spatially-rearrange the split optical signals output from the plurality of phase modulators into a pattern, thereby producing an optical signal pattern; and an optical amplifier arranged at an optical output of the wave-
(Continued)

guide, wherein the optical amplifier is configured to amplify the optical signal pattern produced by the waveguide.

21 Claims, 4 Drawing Sheets

(58) Field of Classification Search
CPC .. H01S 3/0092; H01S 3/0085; H01S 3/06754; H01S 3/1307; H01S 3/2383; H01S 3/10053; H01S 3/0071; H01S 3/1003; H01S 3/00; H01S 3/067; H01S 3/13; H01S 3/23
See application file for complete search history.

(56) References Cited

U.S. PATENT DOCUMENTS

| | | | |
|---|---|---|---|
| 7,792,163 B2 | 9/2010 | Nakayama et al. | |
| 8,184,667 B2 | 5/2012 | Chiang et al. | |
| 8,213,751 B1 | 7/2012 | Ho et al. | |
| 8,847,110 B2 * | 9/2014 | Gu ........................ | B23K 26/36 219/121.61 |
| 8,848,281 B2 | 9/2014 | Sakurai | |
| 9,612,398 B2 | 4/2017 | Vurgaftman et al. | |
| 9,776,277 B2 | 10/2017 | Kleinert | |
| 2005/0157761 A1 | 7/2005 | Rothenberg et al. | |
| 2005/0201429 A1 | 9/2005 | Rice et al. | |
| 2006/0141680 A1 | 6/2006 | Sun et al. | |
| 2008/0180787 A1 | 7/2008 | DiGiovanni et al. | |
| 2008/0253417 A1 | 10/2008 | Livingston | |
| 2009/0201575 A1 | 8/2009 | Fermann et al. | |
| 2010/0142573 A1 | 6/2010 | Minden | |
| 2010/0195195 A1 | 8/2010 | Nelson et al. | |
| 2011/0024927 A1 | 2/2011 | Galvanauskas | |
| 2011/0032604 A1 | 2/2011 | Rothenberg et al. | |
| 2011/0261580 A1 | 10/2011 | Seo et al. | |
| 2014/0259659 A1 * | 9/2014 | Kleinert .............. | H01S 3/10053 219/121.81 |
| 2016/0139266 A1 | 5/2016 | Montoya et al. | |
| 2017/0023843 A1 | 1/2017 | Seifert | |
| 2017/0299900 A1 | 10/2017 | Montoya et al. | |
| 2017/0361398 A1 * | 12/2017 | Kleinert .............. | H01S 3/10053 |
| 2018/0180811 A1 | 6/2018 | Orcutt et al. | |

FOREIGN PATENT DOCUMENTS

| | | |
|---|---|---|
| WO | WO99/42871 A1 | 8/1999 |
| WO | WO2013/160902 A1 | 10/2013 |
| WO | WO2017/012898 A1 | 1/2017 |

OTHER PUBLICATIONS

The PCT/US2020/016631, international search report issued Jul. 24, 2020, 4 pages.
The PCT/US2020/016631, written opinion issued Jul. 24, 2020, 8 pages.
Abdul Rahim et al., "Expanding the Silicon Photonics Portfolio with Silicon Nitride Photonics Integrated Circuits", Journal of Lightwave Technology, vol. 35, No. 4, Feb. 15, 2017, 11 pages.
Ananth Z. Subramanian, et al., "Silicon and Silicon Nitride Photonic Circuits for Spectroscopic Sensing on-a-chip", Photon. Res., vol. 3, No. 5, Oct. 2015, 13 pages.
Arno Klenke et al., "530 W, 1.3 mJ, Four-channel Coherently Combined Femtosecond Fiber Chiped-Pulse Amplification System", Optics Letters, vol. 38, No. 13, Jul. 1, 2013, 3 pages.
Christopher V. Poulton et al., "Optical Phased Array with Small Spot Size, High Steering Range and Grouped Cascaded Phase Shifters", Research Laboratory of Electronics, Massachusetts Institute of Technology, Cambridge, MA 02138, USA 3 pages.
Christopher V. Poulton et al., "Large-Scale Visible and Infrared Optical Phased Arrays in Silicon Nitride", Research Laboratory of Electronics, Massachusetts Institute of Technology, Cambridge, MA 02138, USA, John A. Paulson School of Engineering and Applied Science, Harvard University, Cambridge, MA 02138, USA, College of Nanoscale Science and Engineering, University of Albany, NY 12203, and Currently affiliation is Analog Photonics, One Marina Park Drive, Boston, MA 02210, USA, 2 pages.
Deng Jun, "Fabrication Methodologies for Integrated Photonic Devices in Lithium Niobate", B.Sc., University of Electronic Science and Technology of China, 2013, 169 pages.
Jelena Notaros et al., "Integrated Optical Phased Arrays for Quasi-Bassel-Beam Generation", Optics Letter, vol. 42, No. 17, Sep. 1, 2017, 4 pages.
Pascual Munoz et al., "Silicon Nitride Photonic Integration Platform for Visible, Near-Infrared and Mid-Infrared Applications", Sensors Article, 2017, 25 pages.
Raphael Florentin et al., "Shaping the light Amplified in a Multimode Fiber", Light: Science & Applications, 2017, 9 pages.
Stephen Palese et al., "Coherent Combining of Pulsed Fiber Amplifiers in the Nonlinear Chirp Regime with Intra-pulse Phase Control", Optical Society of America, 2012, 14 pages.
T.W. Hansch and B. Couillaud, "Laser Frequency Stabilization by Polarization Spectroscopy of a Reflecting Reference Cavity", Department of Physics, Stanford University, Sep. 2, 1980, 4 pages.
Xi0 Photonics, "Products applications Services", Aug. 2, 2018, 5 pages.
The Office Action report issued for CN counterpart application No. 202080006675.0 dated Nov. 16, 2023 (9 pages).
The Invitation to Respond to Written Opinion issued for SG counterpart application No. 11202104735X dated Aug. 22, 2023 (7 pages).
The Office Action report issued for JP counterpart application No. 2021-547368 dated Oct. 31, 2023 (8 pages).
Office Action report issued in Korean counterpart application No. 10-2021-7030101 dated Jun. 17, 2024. (6 pages).

* cited by examiner

PHASED-ARRAY BEAM STEERING FOR MATERIALS PROCESSING

CROSS-REFERENCE TO RELATED APPLICATIONS

This application claims the benefit of U.S. Provisional Application No. 62/808,742, filed Feb. 21, 2019 and U.S. Provisional Application No. 62/823,454, filed Mar. 25, 2019, each which is incorporated by reference in its entirety.

BACKGROUND

I. Technical Field

Embodiments described herein relate generally systems and techniques for phased-array beam steering of laser energy.

II. Technical Background

Many processes in the laser-micromachining domain require pulses that are spatially fully separated (at the workpiece) from neighboring pulses. If these pulses overlap spatially, then a variety of negative effects can take place such as local heat accumulation, which negates the beneficial effects of 'athermal ablation' by ultrafast lasers or pulse-plume interaction. Today's state of the art lasers provide high-powered pulses at high repetition rates (i.e., at 1 MHz-100 MHz and higher). Thus to efficiently utilize such lasers, it can be desirable to use beam steering systems having a suitably high positioning bandwidth. For example, acousto-optic deflectors (AODs) provide a positioning bandwidth that is close to 3 orders of magnitude larger than galvos (i.e., ~1 MHz for AODs vs. ~2.5 kHz for galvos). While high-speed beam steering enabled by polygon mirrors has garnered a lot of attention as one solution enabling the scaling to >>1 MHz laser repetition rates with full spot separation, the adoption is limited to a subset of "high fill factor" problems. As developments in laser-based material processing continue to progress to enable formation of features that are smaller and require higher accuracy, beam steering systems capable of directing high repetition rate laser pulses at positioning bandwidths in excess of those provided by AODs and polygon mirrors can provide will eventually be needed.

SUMMARY

One embodiment of the present invention can be broadly characterized as system that includes: a multi-channel beam splitter arranged and configured to split an input first optical signal into a plurality of split first optical signals; a plurality of phase modulators, wherein each phase modulator of the plurality of phase modulators is operative to modify a phase of a corresponding split first optical signal of the plurality of split first optical signals in response to a control signal; a waveguide arranged at an optical output of the plurality of phase modulators, the waveguide configured to spatially-rearrange the split first optical signals output from the plurality of phase modulators into a pattern, thereby producing a first optical signal pattern; and an optical amplifier arranged at an optical output of the waveguide, the optical amplifier configured to amplify the first optical signal pattern produced by the waveguide.

Another embodiment of the present invention can be broadly characterized as system that includes: a beam positioning system operative to deflect a laser beam having a first wavelength; a lens disposed within a beam path along which the laser beam is propagatable after deflection by the beam positioning system; and a harmonic conversion module disposed within a beam path along which the laser beam is propagatable after transmission though the lens, wherein the harmonic conversion module is operative to convert the first wavelength of the laser beam to a second wavelength.

DETAILED DESCRIPTION

Figure 1:
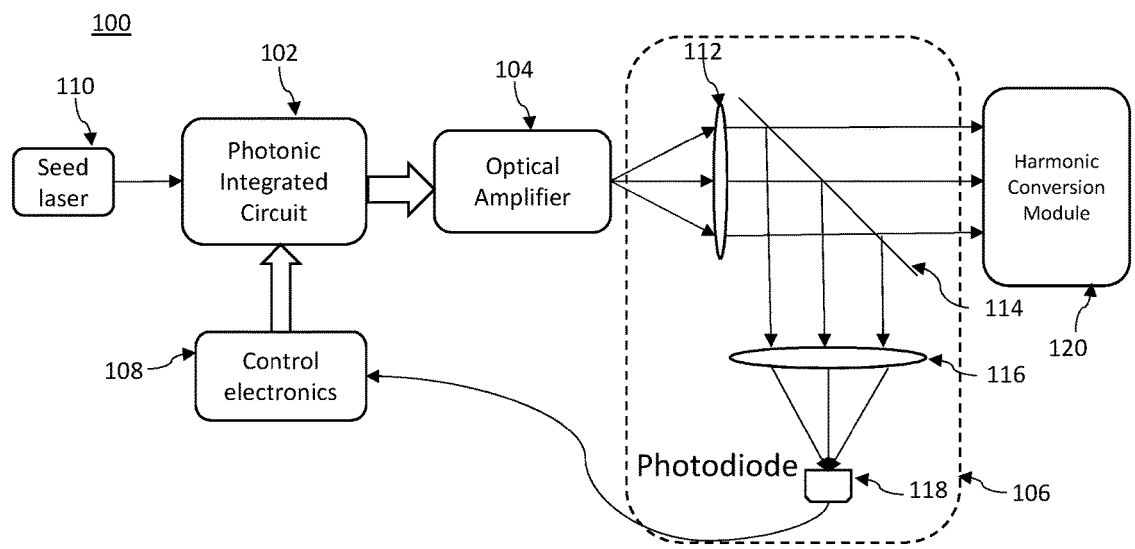
FIG. 1 schematically illustrates a phased-array beam steering system according to one embodiment of the present invention.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Embodiments Concerning PIC-Based Phased-Array Beam Steering, Generally

Referring to FIG. 1, a phased-array beam steering system 100 includes a photonic integrated circuit (PIC) 102, an optical amplifier 104, a feedback system 106, and control electronics 108.

In the illustrated embodiment, the PIC 102 can be optically coupled to the output of a seed laser 110. In another embodiment, the seed laser 110 can be integrated as part of the PIC 102. In one embodiment, the seed laser 110 is a frequency stabilized laser diode with a wavelength greater than 0.9 μm (e.g., 1 μm or thereabout, 1.03 μm or thereabout, 1.06 μm or thereabout, 1.1 μm or thereabout, or any wavelength greater than 1.1 μm). It will be appreciated that other wavelengths in the near-IR range can be output by the seed laser 110.

The seed laser 110 can output laser pulses at a pulse repetition rate in a range from 5 kHz to 50 GHz. It will be appreciated, however, that the pulse repetition rate can be less than 5 kHz or larger than 50 GHz. Thus, laser pulses can be output by the seed laser 110 at a pulse repetition rate less than, greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 60 MHz, 100 MHz, 150 MHz, 200 MHz, 250 MHz, 300 MHz, 350 MHz, 500 MHz, 550 MHz, 600 MHz, 900 MHz, 2 GHz, 10 GHz, 20 GHz, 50 GHz, 75 GHz, etc., or between any of these values. The seed laser 110 can output laser pulses having a pulse width or pulse duration (i.e., based on the full-width at half-maximum (FWHM) of the optical power in the pulse versus time) that is in a range from 20 fs to 900 ms. It will be appreciated, however, that the pulse duration can be made smaller than 20 fs or larger than 900 ms. Thus, at least one laser pulse output by the seed laser 110 can have a pulse duration less than, greater than or equal to 10 fs, 15 fs, 30 fs, 50 fs, 100 fs, 150 fs, 200 fs, 300 fs, 500 fs, 600 fs, 750 fs, 800 fs, 850 fs, 900 fs, 950 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 μs, 5 μs, 10 μs, 15 μs, 20 μs, 25 μs, 30 μs, 40 μs, 50 μs, 100 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values. Alternatively, the seed laser 110 can output a continuous wave (CW) or quasi-CW (QCW) beam of laser energy.

Figure 2:
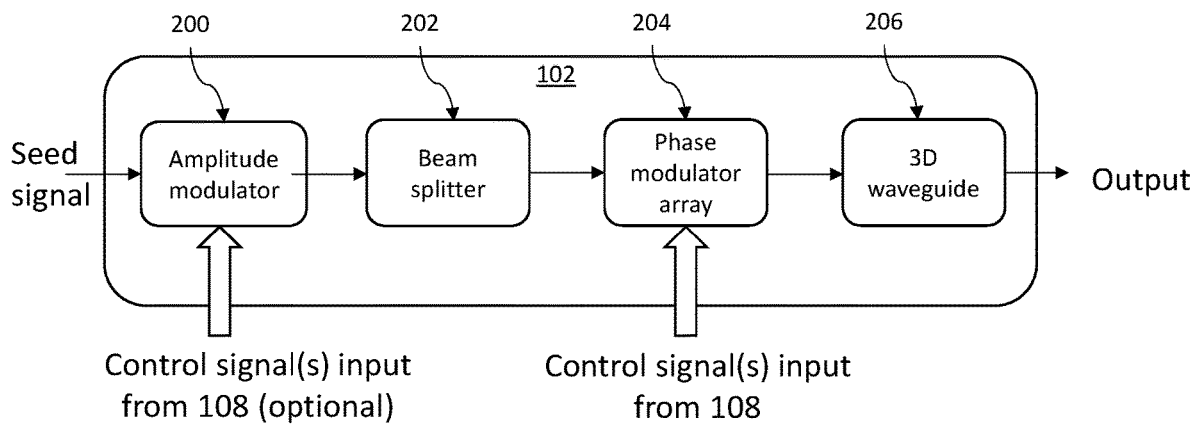
FIG. 2 schematically illustrates a photonic integrated circuit in the phased-array beam steering system shown in FIG. 1, according to one embodiment of the present invention.

Referring to FIG. 2, the PIC 102 includes an amplitude modulator 200, a multi-channel beam splitter 202, a phase modulator array 204, and a 3D waveguide 206. That is, the amplitude modulator 200, multi-channel beam splitter 202, phase modulator array 204, and 3D waveguide 206 are incorporated into a common photonic integrated circuit 102. In other embodiments, however, only two or three of these components are incorporated into a common photonic integrated circuit 102, and the remaining component(s) are separately formed and optically coupled to either the optical input or output of the photonic integrated circuit 102. For example, only the phase modulator array 204 and one or both of the multi-channel beam splitter 202 and 3D waveguide 206 may be incorporated into a common photonic integrated circuit 102.

Referring to the embodiment shown in FIG. 2, the output of the seed laser 110 (also referred to herein as a "seed signal") is amplitude-modulated through the amplitude modulator 200 (e.g., provided as a Mach-Zehnder modulator), in response to one or more control signals output by the control electronics 108. The amplitude modulation can, optionally, be performed to flatten out the pointing/position dependent output amplitude after the optical amplifier (see, e.g., FIG. 9 of U.S. Pat. No. 9,776,277, which is incorporated herein by reference in its entirety), and provides any amplitude modulation needed by the process or system. Subsequently, the seed signal travels through the multi-channel beam splitter 202, which is configured to split the seed signal into a plurality of channels and thereby produce a plurality of "split seed signals." In one embodiment, the multi-channel beam splitter 202 is comprised of any number of 1×2 optical beam splitters sufficient to reach a desired number of channels (e.g. a 256 channel system for a rectangular 16×16 array would require 8 splitting cascades with a total of 255 1×2 splitter components). In another embodiment, the multi-channel beam splitter 202 may be provided as a star splitter or as multiple, cascading, star splitters. In one embodiment, the desired number of channels can be 32, 50, 64, 90, 100, 128, 150, 200, 256, 300, 350, 512, 800, 1024, 1500, 2000, 2500, etc., or between any of these values.

The split seed signals are then guided into the phase modulator array 204. In this case, the phase modulator array 204 includes a plurality of phase modulators, and each of the phase modulators is arranged so as to receive one of the split seed signals produced by the multi-channel beam splitter 202 (i.e., one phase modulator per split seed signal). Further, each phase modulator is operative to maintain or modify the phase of each split seed signal based on one or more control signals output by the control electronics 108. Phase modulators within the phase modulator array 204 may be provided in any suitable or desired manner. For example, each phase modulator may be provided as a Mach-Zehnder modulator (MZM). When suitably provided (e.g., as an MZM), each phase modulator may be operated to maintain or modify the amplitude of each split seed signal (e.g., based on one or more control signals output by the control electronics 108) input thereto.

Next, the phase-modulated signals are rearranged into a densely packed pattern (e.g., hexagonal, rectangular, etc.) via the 3D waveguide 206. Thus, the output of each phase modulator in the phase modulator array 204 is optically coupled to an optical input of the 3D waveguide 206 and the optical output can be characterized as providing a "tiled" arrangement of a plurality of individual optical emitters. The 3D waveguide 206 can be a part of the PIC, as illustrated, or can be a separate component from the PIC. A PIC 102 with some of these properties has been demonstrated and reported in Poulton, Christopher V., et al. "Large-scale visible and infrared optical phased arrays in silicon nitride," Conference on Lasers and Electro-Optics (CLEO), IEEE, 2017, which is understood to show the successful integration of a 10 splitting cascade deep 1024 channel chip with a subsequent antenna array. However, the beam steering mechanism utilized in that paper is based on wavelength sweeping rather than phase modulators.

Highly reliable PICs 102 with integrated arrays of 500 or more phase modulator modulators are currently being developed for automotive LIDAR applications. However, the typical wavelength for these arrays is the eye-safe 1.5 µm band. Nevertheless, such PICs can be adapted to operate at wavelengths in the range from 0.9 µm (or thereabout) to 1.1 µm (or thereabout) by suitably changing the materials from which the components of the PIC are formed. See, for example, U.S. Pat. Nos. 8,213,751 and 9,612,398, U.S. Patent App. Pub. No. 20180180811, Munoz, Pascual, et al. "Silicon Nitride Photonic Integration Platforms for Visible, Near-Infrared and Mid-Infrared Applications," Sensors, 17, 2088 (2017) and Rahim, Abdul et al., "Expanding the Silicon Photonics Portfolio with Silicon Nitride Photonic Integrated Circuits," Journal of Lightwave Technology, Vol. 35, No. 4, Feb. 15, 2017, all of which are incorporated herein by reference in their entireties. In one embodiment, the phase modulators integrated within the PIC 102 have a high bandwidth greater than 1 MHz, (e.g., greater than 1 GHz, etc.).

In one embodiment, the optical amplifier 104 includes one multimode fiber gain module (or multiple multimode fiber gain modules connected in series, e.g., to achieve higher average and peak powers), one or more multicore fiber amplifiers, or the like or any combination thereof. When the optical amplifier 104 includes a multimode fiber gain module, the multimode fiber gain module is chosen such that the number of supported guided modes of the fiber gain module is approximately matched to the number of channels within the pattern produced at the optical output of the 3D waveguide 206. Through this, the output mode of the multimode fiber gain module can be effectively controlled. When the optical amplifier 104 includes a multicore fiber amplifier, the multicore fiber amplifier is chosen such that the number and arrangement of cores in the multicore fiber amplifier is approximately matched to the number and arrangement of channels within the pattern produced at the optical output of the 3D waveguide 206. The light from the PIC 102 is either directly coupled or otherwise imaged into the optical amplifier 104. As has been shown in Florentin, Raphael, et al. "Shaping the light amplified in a multimode fiber." Light: Science & Applications 6.2 (2017): e16208, modal control is possible not only in a passive fiber, but also in a multimode gain fiber. In one embodiment, and unlike in Florentin et al.'s paper, the output mode of the multimode fiber is a supermode that fills most of the multimode fiber core, and its spatial phase can be modulated for steering/shaping in the Fourier plane after a collimating lens (i.e., lens 112, as shown in FIG. 1). The output optical amplifier is collimated by a lens 112 and a small fraction is directed (e.g., via a beam splitter 114 and subsequent lens 116) onto a photodetector 118 (e.g., a fast photodiode). The main power of the amplified output from the optical amplifier 104 (i.e., the fraction of the beam not directed onto the photodetector 118) is herein referred to as the aforementioned "process beam."

Signals output by the photodetector 118 (i.e., in response to detecting light transmitted from lens 116), can be analyzed (e.g., by the control electronics 108) via the LOCSET method (though alternative methods could also be implemented) to derive control signals that are ultimately sent to the phase modulator array 204. Generally the control signals, when acted upon by the phase modulator array 204, are adapted to stabilize the phases of the optical signals output from the optical amplifier 104 to get the desired modal shape, pointing and position at the output of the optical amplifier 104 (e.g., based on one or more predetermined requirements associated with desired phase drift, processing system shape and positioning requirements). In one embodiment, the number of possible channels that can be controlled via the LOCSET method is up to 1000 or thereabout (e.g., slightly less than, or more than, 1000).

The main power output of the optical amplifier 104 (i.e., the aforementioned "process beam") may, optionally, be relayed into a beam positioning system (not shown) in any manner known in the art. Optionally, the process beam may be directed to a harmonic conversion module 120 and then the optical output of the harmonic conversion module 120 can be relayed into the beam positioning system (not shown) in any manner known in the art. The process beam is typically directed from the beam positioning system to process (e.g., crack, damage, melt, vaporize, ablate, foam, mark, etc.) a workpiece (not shown) in any manner known in the art.

In one embodiment, the control electronics 108 is operative to output control signals to the plurality of phase modulators in the phase modulator array 204 so as to effect beam steering (e.g., along one or more axes, in any desired direction) of the process beam that is ultimately output by the phased-array beam steering system 100, to effect beam shaping of the process beam, or any combination thereof, in any suitable or desired manner. As used herein, the term "beam shaping" refers to the act of changing the size or shape of the process beam produced by the phased-array beam steering system 100. The shape of the process beam refers to the spatial distribution or profile of the optical intensity of the process beam, as measured within a plane orthogonal to the beam axis of the of the process beam. Thus, the process beam can be comprised of a single "beam" or of multiple, spatially separated "beamlets." As used herein, the size of a "beam" or a "beamlet" refers to the maximal or average width of the beam or beamlet, as measured along a radial or transverse distance from the beam axis to where the optical intensity drops to, at least, $1/e^2$ of the optical intensity at the propagation axis of the beam or beamlet. Within the resolution of the pattern achievable by the 3D waveguide, the phased-array beam steering system thus enables the creation of a beam (or beamlet) having any shape (e.g., flat top, Gaussian, Hermite-Gaussian, Laguerre-Gaussian, Bessel, quasi-Bessel, circular-annular, square-annular, or the like, or otherwise, or any combination thereof). As will be appreciated, the process beam can be formed to have any shape or size while it is being steered, and the phased-array beam steering system 100 can be operated to change or maintain the shape and/or size of the process beam while the process beam is being steered.

The harmonic conversion module 120 may include a second harmonic generation (SHG) medium, a third harmonic generation (THG) medium, or the like or any combination thereof, as is known in the art. It will be appreciated that the wavelength of light output by the harmonic conversion module 120 will depend upon the medium from which the harmonic conversion module is formed (e.g., a SHG medium, a THG medium, etc.) and the wavelength of light input to the harmonic conversion module (e.g., as output by the multimode fiber gain module). Thus, if the wavelength of light input to the harmonic conversion module 120 is in the near-IR range (e.g., as discussed above), then the wavelength of light output from the harmonic conversion module 120 may be generally characterized as being in the visible-green range of the electromagnetic spectrum or in the ultraviolet range of the electromagnetic spectrum.

Generally, the beam positioning system is provided as a high-bandwidth beam positioning system (i.e., having a bandwidth greater than 1 kHz), such as an AOD, an electro-optic deflector (EOD), a galvanometer mirror scanner, a rotating polygon scanner, or the like or any combination thereof.

Further Embodiments

As discussed above, embodiments of the present invention can be adapted to combine (coherently, or otherwise) the output of the optical amplifier with the ability to steer or shape the process beam at up to GHz bandwidths. Hence, unlike conventional coherent beam combining (i.e., where beams are spatially overlapped through a tree of thin film polarizers, diffractive optics, etc.), embodiments discussed herein can be adapted to 'tile' the output of the individual emitters, but still establish a stable and controllable phase relationship among the individual optical signals.

In some embodiments, the optical amplifier 104 discussed above with respect to FIG. 1 can be operated in a pulsed mode with a very wide range of pulse widths and repetition rates. Accordingly, the seed laser 110 can be operated to generate a seed signal composed of a plurality of optical pulses having a wide range of pulse widths (e.g., from 10s of nanoseconds to a few picoseconds) and repetition rates (e.g., from 100 kHz to 50 GHz). As mentioned above, the phases of the signals output from the phase modulator array 204 are controlled via the LOCSET method, which is well-suited for the coherent combination of a large number of channels even in a 'tiled' output arrangement.

Unfortunately however, the LOCSET method is not readily compatible with optical pulses as an input. Accordingly, in one embodiment, and unlike the embodiment shown in FIG. 1, when the process beam is manifested as a series of pulses, the process beam is not used for phase-locking. Rather, the phased-array beam steering system 100 can be modified to operate upon a second laser beam (also referred to herein as a "reference beam" or "probe beam"), in addition to the seed signal (also referred to herein as the "main beam") generated by the seed laser 110. The reference beam has a wavelength that is only slightly, or not at all, amplified by the optical amplifier 104. The reference beam can thus be used to track the phase drifts of each channel both between and during optical pulses while it, itself, does not get appreciably amplitude-modulated and, hence, provides a stable signal for the LOCSET circuit to analyze. One example of a suitable modified phased-array beam steering system is discussed with respect to FIG. 3, and is illustrated generally at reference numeral 300.

Figure 3:
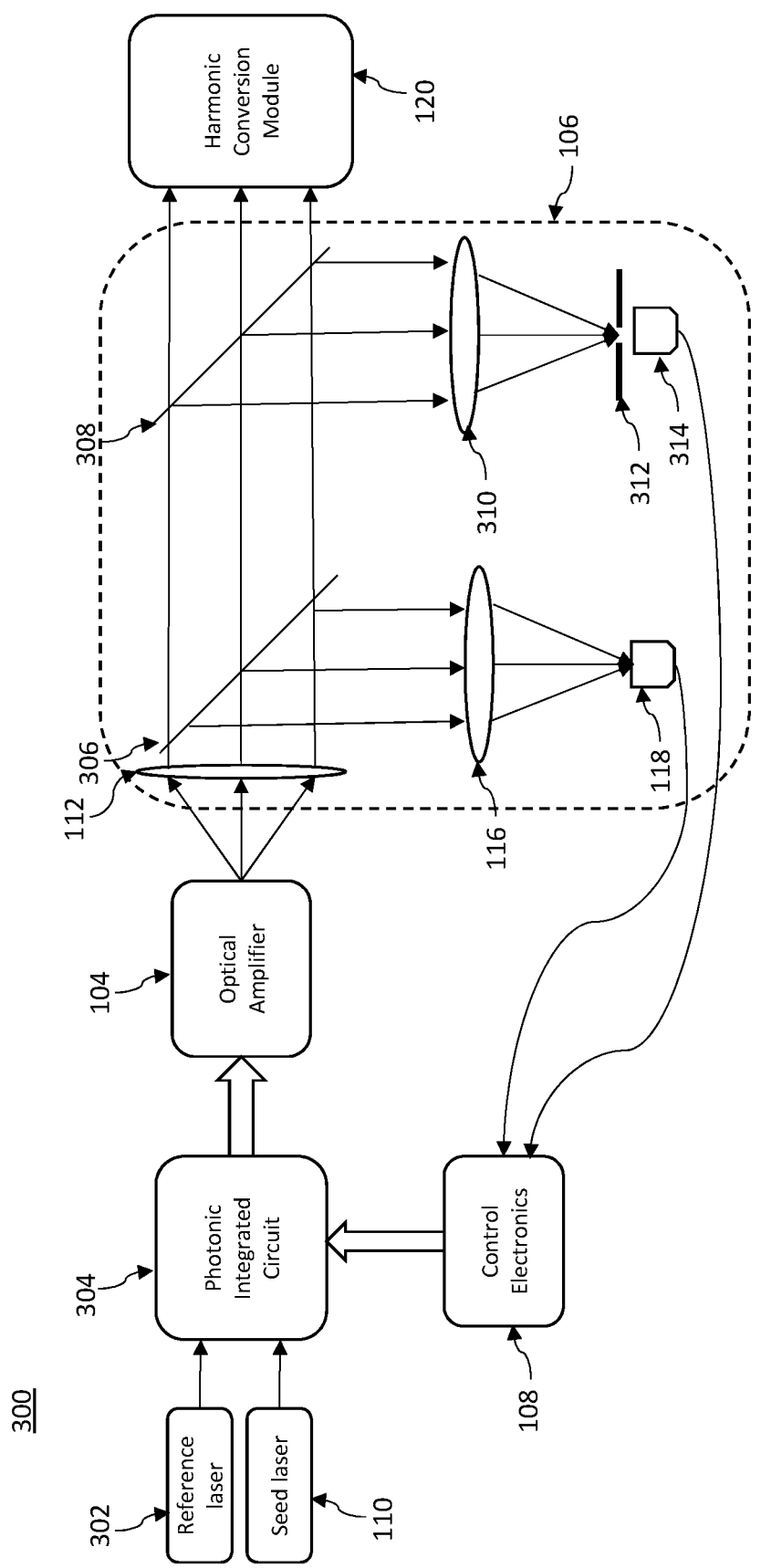
FIG. 3 schematically illustrates a phased-array beam steering system according to another embodiment of the present invention.

Referring to FIG. 3, both the seed laser 110 (e.g., generating a main beam manifested as a series of laser pulses with a desired pulse width and at a desired pulse repetition rate) and a reference laser 302 (e.g., generating the aforementioned reference beam) are coupled into a common photonic integrated circuit (PIC) 304. Generally, the photonic integrated circuit (PIC) 304 can be provided as discussed above with respect to FIGS. 1 and 2, but may be modified as discussed in greater detail with respect to FIG. 4.

The optical output of the PIC 304 is then amplified by the optical amplifier 104. The optical beam output by the optical amplifier 104 is composed of the main beam and the reference beam. However, the reference beam is separated from the main beam (e.g., by a simple dichroic mirror 306) and directed onto the aforementioned photodetector 118 of the LOCSET system. The main beam, which was amplified by the optical amplifier 104, is transmitted through the mirror 306 and so does not reach the photodetector 118, nor does it perturb (e.g., saturate) the photodetector 118.

Figure 4:
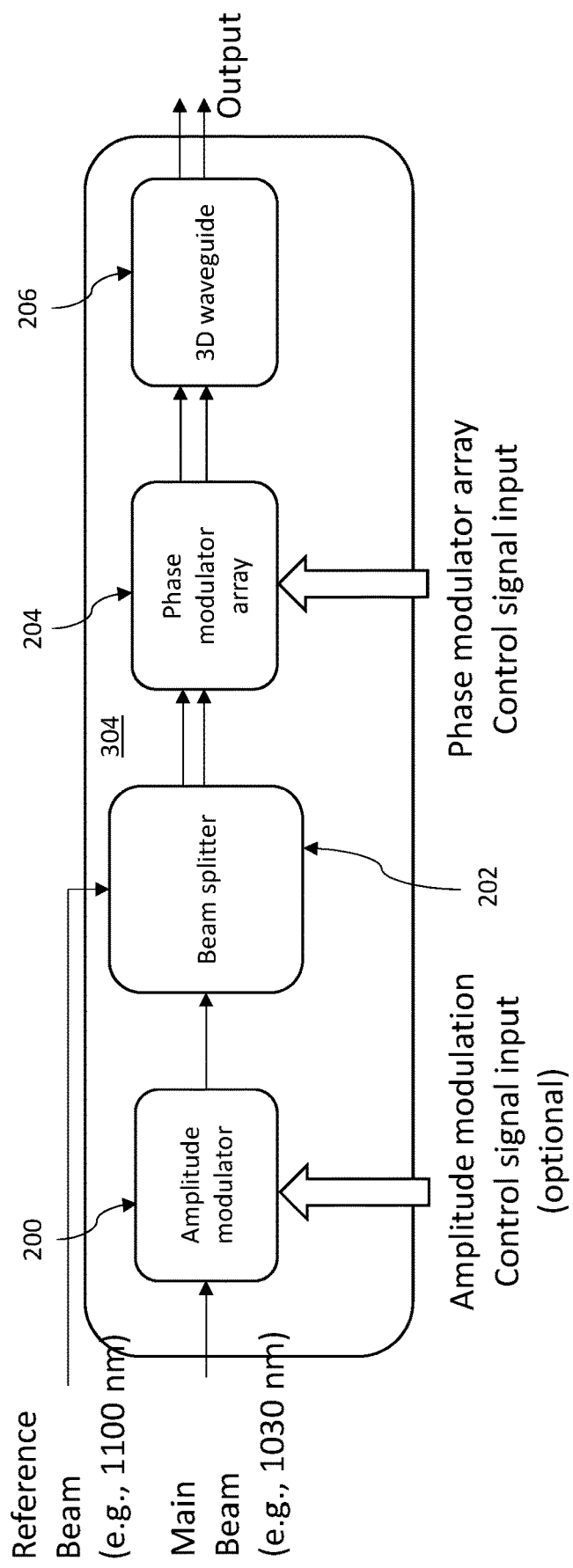
FIG. 4 schematically illustrates a photonic integrated circuit in the phased-array beam steering system shown in FIG. 3, according to one embodiment of the present invention.

Referring to FIG. 4, PIC 304 is configured to operate on the wavelength of the main beam (also referred to herein as the "main wavelength") (e.g., 1030 nm+/−5 nm) as well as on the wavelength of the reference beam, which is different from the wavelength of the main beam. Generally, the reference beam can be characterized as having a relatively narrow linewidth, long coherence length. In some embodiments, the wavelength of the reference beam (also referred to herein as the "reference wavelength") is in a range from 1070 nm (or thereabout) to 1150 nm (or thereabout) (e.g., 1100 nm). The beam splitter in the PIC 304 is provided as a dual-wavelength beam splitter, and needs to be engineered to not only evenly split the main beam at the main wavelength, but to also simultaneously split the reference beam (i.e., thereby producing a plurality of "split reference signals") at the reference wavelength. Correspondingly, all subsequent components, like the phase modulator array 204 and any subsequent beam guiding and shaping optics (e.g., the 3D waveguide 206) also need to be compatible with the wavelengths of both the main beam and the reference beam. In this case, the 3D waveguide 206 is configured to spatially-rearrange the split reference signals output from the phase modulators of the phase modulator array 204 into the pattern such that the split reference signals are coherently combinable into a combined reference signal.

The modifications discussed above to accommodate beams of laser energy at the main wavelength and at the reference wavelength preclude the use of large-mode photonic crystal fibers, which have only a fairly narrow wavelength range in which the guided mode is stable and close to single mode (1100 nm is well outside that range). However, due to the coherent addition of a large number of modes—either in separate cores or in a multimode fiber (or in a solid state amplifier)—the use of smaller mode field diameters is not a concern.

Another issue that arises from the modifications discussed above is that driving the phase differences between the different channels down to zero at the reference wavelength does not at all imply that the phase differences between the different channels can simultaneously be driven down to zero for the main wavelength. Hence, an additional phase calibration is needed. This is shown in FIG. 3, where an additional beam pickoff 308 collects a sample of the amplified main beam which is then focused (e.g., via lens 310) onto an aperture 312 with a photodetector 314 (e.g., a photodiode) behind it. A classic (slow) SPGD algorithm can be used to work out the phase relationships at the main wavelength once during calibration, where the LOCSET electronics can detect the corresponding phase relationships at the reference wavelength and stabilize any phase drifts during the calibration step, so that even very large numbers of channels can be optimized. Subsequently, every 'phase wrap' (i.e. a phase drift larger than 2 pi corresponding to the reference wavelength) can be counted and kept track of such that the overall phase relationship at the main wavelength can be controlled, even if differential path length drifts of the individual channels accumulates to many microns. For example, a differential drift of 20 μm would be measured as 18 'wraps' and a 0.36 pi phase drift (18×2 pi+0.36 pi=36.36 pi=2 pi*20 μm/1100 nm) at 1100 nm, but is readily translated into 19 'wraps' and a 0.83 pi phase drift at 1030 nm. Hence, the control electronics 108 can compensate for a 0.83 pi phase shift at 1030 nm with the corresponding phase modulator to bring the two channels back into their nominal phase relation.

The advantage with the embodiments discussed with respect to FIGS. 3 and 4 is that the phase locking electronics is decoupled from the repetition rate and pulse widths of the main beam, which may be vary depending on the seed laser used or the variable manner with which the seed laser is operated. As with the embodiments discussed above with respect to FIGS. 1 and 2, the process beam, as transmitted by the beam pickoff 308 shown in FIG. 3 may, optionally, be directed to a harmonic conversion module 120, relayed into a beam positioning system (not shown) in any manner known in the art, or the like or any combination thereof.

Additional Embodiments Concerning Harmonic Conversion

As discussed above, the aforementioned collimating lens 112 described in connection with the embodiments illustrated in FIGS. 1 and 3, is configured to ensure that the process beam is a collimated (or at least substantially collimated) beam of light. Thus, all rays in the process beam can be parallel (or at least substantially parallel) to the harmonic generation module 120 independent of the angle with which the process beam is steered (i.e., by the phased-array steering techniques discussed above) so as to match the necessary boundary conditions for efficient harmonic generation.

Although FIGS. 1 and 3 illustrate a system in which no lenses are arranged in the beam path along which the process beam (as output by the phased-array beam steering system) is propagatable, it will be appreciated that one or more lenses, mirrors, or the like or any combination thereof, may be provided to reduce the size (e.g., width or diameter) of the process beam that ultimately propagates into the harmonic conversion module.

Figure 5:
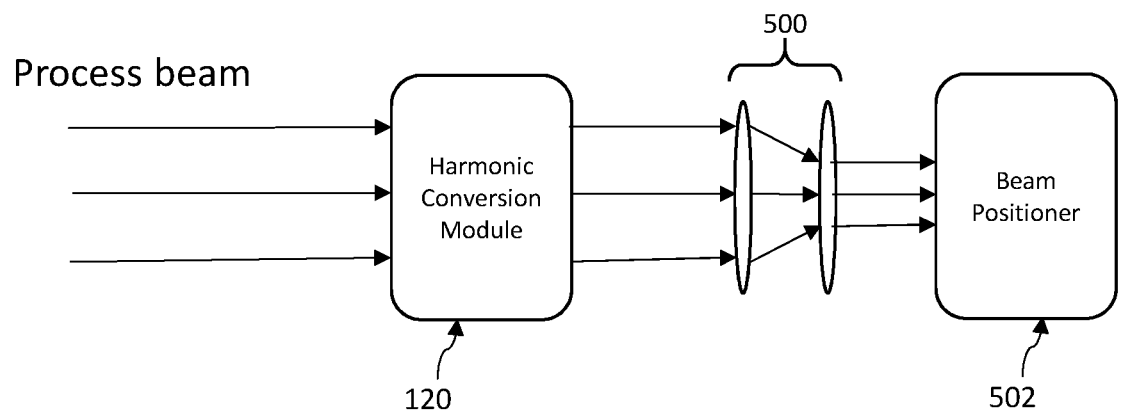
FIGS. 5 and 6 schematically illustrate different embodiments for implementing post-steering wavelength conversion of laser energy.

In some cases, beam positioning systems such as AODs and EODs may work suitably with light within a certain wavelength range (e.g., within the infra-red range of the electromagnetic spectrum), but not necessarily with light within other wavelength ranges (e.g., within the visible or ultraviolet ranges of the electromagnetic spectrum). Thus, the harmonic generation module 120 may be interposed, when desired, between the phased-array beam steering system 100 or 300 and a beam positioning system (e.g., to convert the wavelength of the process beam into another wavelength). In an embodiment shown in FIG. 5, a lens (e.g., relay lens 500) is, optionally, interposed, between the harmonic conversion module and a beam positioning system 502 (e.g., an AOD, an electro-optic deflector (EOD), a galvanometer mirror scanner, a rotating polygon scanner, or the like or any combination thereof) to reduce the extent of the lateral displacement of the process convert as caused by lens 112.

Figure 6:
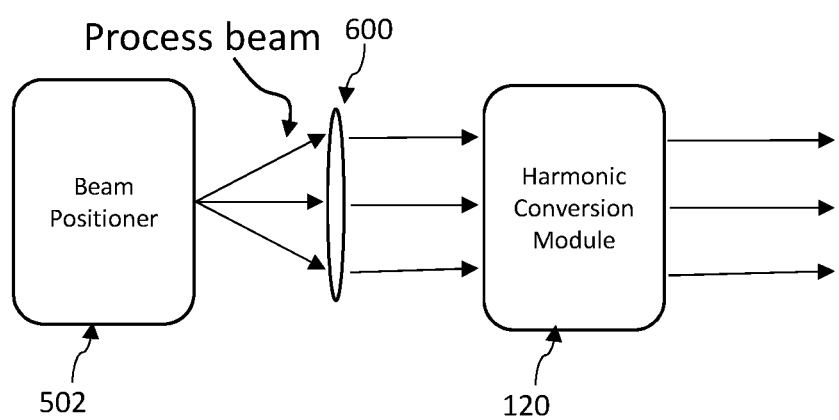

Although use of the harmonic conversion module 120 has been discussed in connection with various embodiments the phased-array beam steering system 100 and 300, it will be appreciated that the harmonic conversion module 120 may be used to convert the wavelength of a process beam output by any beam positioning system 502 (e.g., an AOD, EOD, galvanometer mirror scanner, rotating polygon scanner, etc.). In this case, and as exemplarily shown in FIG. 6, a lens (e.g., 600) can be interposed in the beam path between the beam positioning system 502 and the harmonic conversion module 120. In the embodiment shown in FIG. 6, the optical output of the beam positioning system 502 is located at or near the focal point of lens 600, as is the optical input of the harmonic conversion module 120.

By locating the harmonic conversion module 120 "optically downstream" of the phased-array beam steering system 100 or 300 or any other beam positioning system (e.g., an AOD, EOD, galvanometer mirror scanner, rotating polygon scanner, etc.), the benefits associated with use of such beam positioning systems can be realized for a multitude of wavelengths.

For example, shear wave $TeO_2$ AODs can have a large number of resolvable spots (typically greater than 100), which makes them very attractive beam steering devices. However, shear wave $TeO_2$ AODs cannot be used to deflect relatively high-power process beams (i.e., above 10 W, or thereabout) having a wavelength in the UV range of the electromagnetic spectrum. By providing the lens 600 and harmonic conversion module 120 "optically downstream" of the shear wave $TeO_2$ AOD, the wavelength of the process beam output by the shear wave $TeO_2$ AOD can be converted to a wavelength in the UV range of the electromagnetic spectrum.

In another example, the materials typically used for EODs work in the IR and—to some degree—in the visible ranges of the electromagnetic spectrum, but not at all in the UV range of the electromagnetic spectrum. By providing the lens 600 and harmonic conversion module 120 "optically downstream" of an EOD, the wavelength of the process beam output by the EOD can be converted to a wavelength in the UV range of the electromagnetic spectrum.

In another example, crystal quartz AODs are capable of operating in the UV and IR ranges of the electromagnetic spectrum, and the number of resolvable spots capable of being produced by the quartz AOD is the same for both wavelengths when the same bandwidth and acoustic aperture size are used. However, it is typically easier to scale the power of the process beam in the IR range of the electromagnetic spectrum than in the UV range of the electromagnetic spectrum and so losing power in the IR range of the electromagnetic spectrum due to the limited diffraction efficiency of a quartz AOD can be compensated for more easily than for power losses encountered with a process beam having a wavelength in the UV range of the electromagnetic spectrum even though quartz AODs typically have a relatively high diffraction efficiency in the UV range of the electromagnetic spectrum. Accordingly, by providing the lens 600 and harmonic conversion module 120 "optically downstream" of a quartz AOD, the IR wavelength of a relatively high-power process beam input to the quartz AOD can be diffracted (e.g., so as to be deflected, or otherwise) by the quartz AOD, and the diffracted process beam can then be converted to a wavelength in the UV range of the electromagnetic spectrum.

CONCLUSION

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A beam steering system for materials processing, the system comprising:
    a multi-channel beam splitter arranged and configured to split an input optical signal into a plurality of split optical signals;
    a plurality of phase modulators, wherein each phase modulator of the plurality of phase modulators is operative to modify a phase of a corresponding split optical signal of the plurality of split optical signals in response to a control signal;
    a waveguide arranged at an optical output of the plurality of phase modulators, the waveguide configured to spatially-rearrange the split optical signals output from the plurality of phase modulators into a pattern such that the split optical signals are coherently combinable into a combined optical signal;
    an optical amplifier arranged at an optical output of the waveguide, the optical amplifier configured to amplify the spatially-rearranged split optical signals output by the waveguide, thereby outputting an optical beam including the combined optical signal;
    a harmonic conversion module arranged and configured to modify a wavelength of the combined optical signal; and
    a lens arranged between the optical amplifier and the harmonic conversion module, wherein the lens is configured to collimate light in the combined optical signal received at the harmonic conversion module.

2. The system of claim 1, further comprising:
    a beam splitter arranged at an optical output of the optical amplifier, the beam splitter configured to transmit a first portion of the combined optical signal output by the optical amplifier and reflect a second portion of the combined optical signal output by the optical amplifier; and
    a photodetector arranged to receive the second portion of the combined optical signal and output a corresponding detection signal.

3. The system of claim 2, further comprising control circuitry communicatively coupled to an output of the photodetector and to an input of each of the plurality of phase modulators, wherein the control circuitry is configured to generate and output the control signal.

4. The system of claim 3, further comprising an amplitude modulator operative to modulate an amplitude of the input optical signal in response to a control signal, wherein the multi-channel beam splitter is arranged at an optical output of the amplitude modulator.

5. The system of claim 4, wherein the amplitude modulator and the multi-channel beam splitter are located within a common photonic integrated circuit.

6. The system of claim 4, wherein the control circuitry is configured to output a control signal to each of the plurality of phase modulators to effect, in combination with the configuration of the pattern of the waveguide, phased-array beam steering at the optical output of the waveguide.

7. The system of claim 3, wherein the control circuitry is configured to output a control signal to the plurality of phase modulators based, at least in part on the detection signal, to stabilize the phases of the split optical signals output from the optical amplifier.

8. The system of claim 1, wherein the plurality of phase modulators and the waveguide are located within a common photonic integrated circuit.

9. The system of claim 1, further comprising a seed laser arranged and configured to generate the input optical signal.

10. The system of claim 1, wherein the number of phase modulators in the plurality of phase modulators is greater than 100.

11. The system of claim 1, further comprising a beam positioning system arranged and configured to deflect the combined optical signal output from the harmonic conversion module.

12. The system of claim 11, wherein the beam positioning system includes at least one selected from the group consisting of an acousto-optic deflector, an electro-optic deflector, a galvanometer mirror scanner and a rotating polygon scanner.

13. The system of claim 1, wherein each of the plurality of phase modulators is additionally operative to modify an amplitude of a corresponding split optical signal of the plurality of split optical signals in response to a control signal.

14. The system of claim 1, wherein each of the plurality of phase modulators is provided as a Mach-Zehnder modulator.

15. A beam steering system for materials processing, the system comprising:
    a multi-channel beam splitter configured to split an input first optical signal and an input second optical signal into a plurality of split first optical signals and a plurality of split second optical signals, respectively, wherein the input first optical signal has a first wavelength and the input second optical signal has a second wavelength different from the first wavelength;
    a plurality of phase modulators arranged at an optical output of the multi-channel beam splitter, wherein each phase modulator of the plurality of phase modulators is operative to modify a phase of a corresponding split first optical signal of the plurality of split first optical signals and operative to modify a phase of a corresponding split second optical signal of the plurality of split second optical signals in response to a control signal;
    a waveguide including an optical input optically coupled to an optical output of the plurality of phase modulators and an optical output arranged in a predetermined pattern such that the plurality of split first optical signals are coherently combinable into a combined first optical signal and the plurality of split second optical signals are coherently combinable into a combined second optical signal; and an optical amplifier arranged at the optical output of the waveguide, the optical amplifier configured to amplify the spatially-rearranged split first optical signals output by the waveguide, thereby outputting an optical beam including the combined first optical signal and the combined second optical signal.

16. The system of claim 15, further comprising a reference laser configured to generate the input second optical signal.

17. The system of claim 16, wherein the second optical signal has a second wavelength that is different from a wavelength of the first optical signal.

18. The system of claim 15, further comprising a dichroic mirror arranged and configured to reflect the combined second optical signal of the optical beam and transmit the combined first optical signal of the optical beam.

19. The system of claim 18, further comprising a photodetector arranged to receive the combined second optical signal reflected by the dichroic mirror and output a corresponding detection signal.

20. The system of claim 19, further comprising control circuitry communicatively coupled to an output of the photodetector and to an input of each of the plurality of phase modulators, wherein the control circuitry is configured to generate and output the control signal to the plurality of phase modulators based, at least in part on the detection signal, to stabilize the phases of the split second optical signals output from the plurality of phase modulators.

21. The system of claim 15, wherein the optical amplifier is configured to amplify the plurality of split first optical signals output by the waveguide selectively with respect to the plurality of split second optical signals.

* * * * *